(12) United States Patent
Tunacik, Jr. et al.

(10) Patent No.: US 8,844,387 B1
(45) Date of Patent: Sep. 30, 2014

(54) INSPECTION SLED

(75) Inventors: Daniel Martin Tunacik, Jr., Snoqualmie, WA (US); Dustin Donahoo, Port Orchard, WA (US); Stuart Moore, Silverdale, WA (US); Kent Werle, Port Orchard, WA (US)

(73) Assignee: General Construction Company, Inc., Federal Way, WA (US)

( * ) Notice: Subject to any disclaimer, the term of this patent is extended or adjusted under 35 U.S.C. 154(b) by 398 days.

(21) Appl. No.: 12/833,878

(22) Filed: Jul. 9, 2010

(51) Int. Cl.
*G01N 19/08* (2006.01)

(52) U.S. Cl.
USPC .......................................... 73/865.8; 73/159

(58) Field of Classification Search
USPC ......................................... 73/865.8, 622, 159
See application file for complete search history.

(56) References Cited

U.S. PATENT DOCUMENTS

| | | | |
|---|---|---|---|
| 1,999,771 A | * | 4/1935 | Mample ........................ 137/317 |
| 3,559,461 A | * | 2/1971 | Dudderar ........................ 73/797 |
| 4,421,284 A | * | 12/1983 | Pan ............................ 242/478.1 |
| 4,433,586 A | * | 2/1984 | Ohrnell et al. ............ 73/862.471 |
| 4,833,927 A | * | 5/1989 | Park ........................ 73/862.451 |
| 4,893,074 A | * | 1/1990 | Holt et al. ................ 324/750.19 |
| 5,321,356 A | * | 6/1994 | Weischedel ................... 324/262 |
| 5,348,208 A | * | 9/1994 | Tamura ............................ 226/24 |
| 8,590,480 B1 | * | 11/2013 | Morgan ........................ 118/307 |

FOREIGN PATENT DOCUMENTS

JP      2002-2333     * 1/2002

OTHER PUBLICATIONS

Translation 2002-2333.*

* cited by examiner

*Primary Examiner* — Hezron E Williams
*Assistant Examiner* — Nashmiya Fayyaz
(74) *Attorney, Agent, or Firm* — Mann Law Group

(57) ABSTRACT

An inspection sled for remotely inspecting cables includes a chassis. The left end and right end of the chassis each includes a collar and a swing arm. Swing arms can be opened to admit a cable within the confines of the collars. The swing arms can be closed such that the cable is journaled within the collars, thus allowing the inspection sled to travel along the length of the tensioned cable to perform inspections of the tensioned cable.

17 Claims, 7 Drawing Sheets

INSPECTION SLED

BACKGROUND

Cables are often used as tensioning members to support and/or stabilize a great variety of structures. Cables are especially used in conjunction with such structures in situations where long distances are spanned to provide the support and/or stabilization. Such situations often involve great heights or depths, which make installation, inspection, and removal of the cables installed in such situations difficult and even hazardous in many cases. For example, cables that are used to anchor floating structures often extend for thousands of feet and reach depths of over a hundred fathoms (over 600 feet). At such depths and distances, it is impractical to use human divers. In place of using human divers, submarines and/or robotic submersibles can be used to perform inspections of submerged cables. Using the submarines and/or robotic submersibles often incurs large costs when transporting and operating such equipment.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

An inspection sled for remotely inspecting cables includes a chassis. The left end and right end of the chassis each includes a collar and a swing arm. Swing arms can be opened to admit a cable within the confines of the collars. The swing arms can be closed such that the cable is journaled within the collars, thus allowing the inspection sled to travel along the length of the tensioned cable to perform inspections of the tensioned cable.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. The disclosure herein is, therefore, not to be taken in a limiting sense.

DETAILED DESCRIPTION

Figure 1:
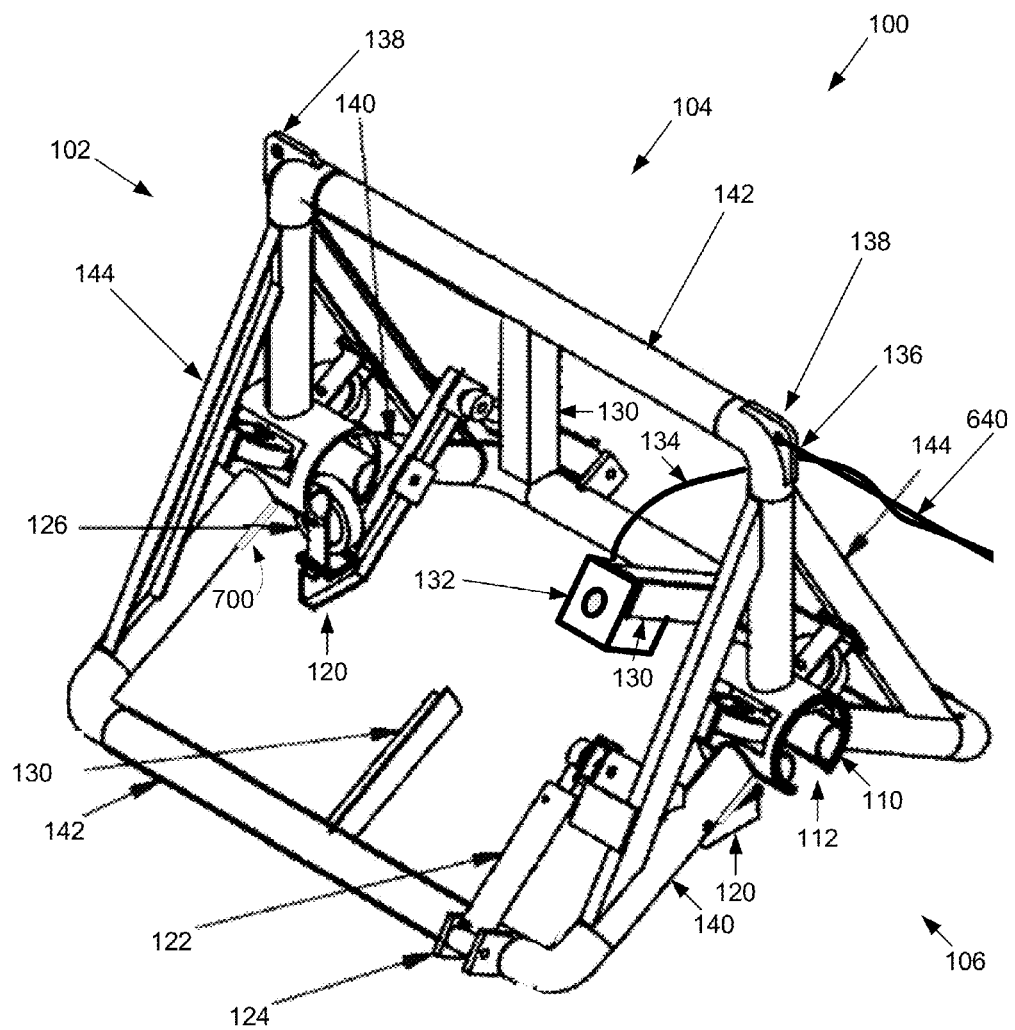
FIG. 1 is an isometric view illustrating an embodiment of an inspection sled.

Various embodiments will be described in detail with reference to the drawings, wherein like reference numerals represent like parts and assemblies throughout the several views. Many details of certain embodiments of the disclosure are set forth in the following description and accompanying figures so as to provide a thorough understanding of the embodiments. Reference to various embodiments does not limit the scope of the claims attached hereto. Additionally, any examples set forth in this specification are not intended to be limiting and merely set forth some of the many possible embodiments for the appended claims.

FIG. 1 is an isometric view illustrating an embodiment of an inspection sled 100. (The term "sled" as used herein is meant generally to encompass the meaning of a traveling unit, and is not meant to limit the means by which the unit travels.) The inspection sled 100 includes a left end 102, a chassis 104, and a right end 106. The left end 102 and right end 106 each include a collar 110 and a swing arm 120. As described in greater detail below (for example, with respect to FIGS. 2-4), swing arms 120 can be opened to admit a tensioned cable within the confines of the collars 110. Swing arms 120 can be closed such that the tensioned cable is journaled within the collars 110, thus permitting the inspection sled 100 to travel along the length of the tensioned cable to perform inspections of the tensioned cable.

The chassis 104 includes at least one inspection station 130. The inspection station 130 can include, for example, a sensor 132. A sensor 132 can be a camera, transducer, feeler, or any sensing device that can be used, for example, to remotely inspect the tensioned cable. Sensor 132 can generate a signal in response to the inspection and transmit the signal, for example, along signal cable 134. Signal cable 134 can be deployed with (and/or be coextensive with) deployment cable 136, which is used to deploy the inspection sled 100. Deployment cable 136 can be, for example, removably attached to attachment point 138 to permit deployment and retrieval of the inspection sled 100. Likewise, both attachment points 138 can be used, for example, to facilitate lifting and handling of the inspection sled 100.

Inspection stations 130 can be disposed, for example, radially at angles of 120 degrees around the longitudinal axis of the inspection sled 100. Providing a sensor 132 to each of the inspection stations 130 can provide for uninterrupted circumferential inspection of the tensioned cable. As described further below with reference to FIG. 6, the inspection sled can be moved along the direction of the longitudinal axis to inspect desired lengths of the cable.

Each collar 110 can be structurally coupled via chassis 104 to the accompanying collar on the opposite end of the inspection sled 110. For example, a series of radial arms 140 (each having a proximal end disposed at approximately 120 degree intervals in an arc orthogonal to the longitudinal axis) and longitudinal arms 142 (disposed longitudinally between distal ends of corresponding radial arms 140) can be arranged to provide an integrated vehicle for inspection as disclosed herein. (In various embodiments, for example, two, four, or more radial arms can be provided.) To provide additional rigidity, for example, braces 144 can be arranged between adjacent radial arms, between adjacent longitudinal arms, or a between a combination thereof (see also braces 144 of sled 100 in FIG. 6). The collar 110, longitudinal arms 142, radial arms 140, braces 144, pistons 122, rotational members 126 (described below), and other material can be selected for use in a marine environment and rated to withstand forces expected to be encountered in various inspection situations as seen by the instant disclosure. Forces expected to be encountered include forces encountered when deploying the sled by pulling the sled along the cable by using a skiff (powered by a 50-horsepower outboard engine, for example), or pulling the sled along the cable by using a winch (such as a pneumatically driven winch, for example).

Inspection stations 130 can be arranged, for example, circumferentially about the longitudinal axis. Inspection stations 130 can be removably affixed and/or the sensor 132 can be removably affixed, for example, in order to allow replacement of broken, outdated, and/or types of sensors 132. The inspection stations 130 may provide, for example, a docking surface and/or connectors to securely fasten the sensors 132 in position. The inspection stations 130 may also provide, for example, electrical connections to power, provide, and receive signals from and to the sensors 132.

Swing arm 120 can be, for example, a lever arm driven by a piston 122. Swing arm 120 can be, for example, coupled between a rotational point of attachment 124 of a longitudinal arm 140 and a proximal portion of the swing arm 120. The distal portion of the swing arm 120 can have a rotational member 126. The rotational member 126 can be, for example, a wheel that is arranged to rotate about an axis that is at right angles to the longitudinal axis of the inspection sled 100. The rotational member 126 can also be, for example, a belt (e.g., a track) disposed around adjacent rollers and/or capstans. As discussed below with reference to FIGS. 2-4, the piston 122 can be driven to pivot the swing arm 120 such that the distal portion of the rotational member temporarily fixedly occludes an aperture 112 in collar 110, thus slidably journaling a tensioned cable inserted therethrough. The swing arm can be hydraulically driven such that the swing arm remains driven closed by a check valve for maintaining hydraulic pressure after a hydraulic pump is removed.

Figure 2:
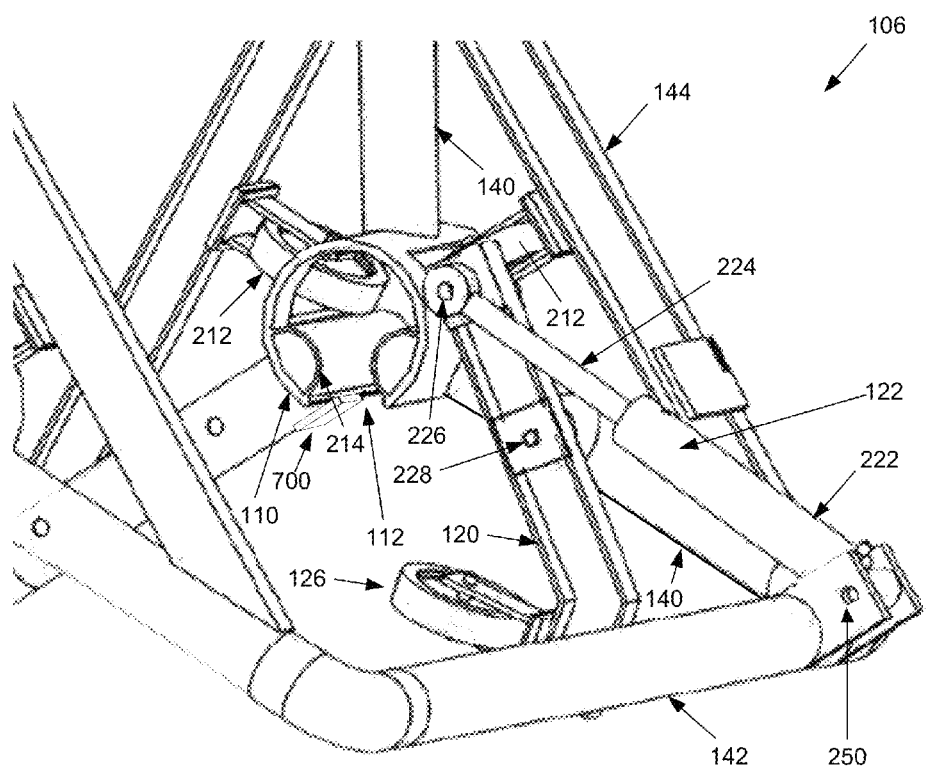
FIG. 2 is an isometric view of an embodiment of a right end of an inspection sled having a swing arm in an open position.

FIG. 2 is an isometric view of an embodiment of a right end 106 of an inspection sled 100 having a swing arm 120 in an open position. The swing arm 120 can be opened and closed (with respect to the aperture 112, for example) by controllably actuating piston 122. (Actuating piston 122 is described below, for example, with reference to FIG. 5.) Piston 122 can be a hydraulic cylinder 222 arranged to extend and retract piston arm 224. The distal portion of piston arm 224 is rotatably attached to a proximal portion 226 of the swing arm 120. Swing arm 120 can be arranged, for example, to have a central portion 228 rotatably coupled to a radial arm 140 at joint 250.

Extension of piston arm 224 can cause swing arm 120, for example, to pivot around the rotatably coupled central joint 228. Such pivoting of the swing arm 120 can cause the distal portion of the rotational member to swing away from an aperture 112 in collar 110, thus opening aperture 112 in collar 110 for insertion of a tensioned cable.

Collar 110 may include rotational members 212, for example, to reduce frictional forces as the inspection sled is deployed along a tensioned cable. One of more rotational members can be, for example, rotatably fixed (not shown) to collar 110, or attached (shown) to brace 144 and having a portion extending through associated apertures in collar 110.

As described below in FIG. 3, collar 110 may also include, for example, cable guides 214. The cable guides 214 can be, for example, half-pipes welded to the collar 110. The cable guides 214 can be provided for narrowing aperture 112 (for lessening the degree of freedom of a cable being inserted therethrough, for example), strengthening collar 110, and/or reducing or preventing contact of any sharp edge of the flanges of collar 110 along the edges of aperture 112. Bushings 700 can be made of ultra-high molecular weight polyethylene, for example, and can be permanently coupled to the sled 100 to protect both the cable to be inspected (during insertion, for example) and the sled 100 itself).

Figure 3:
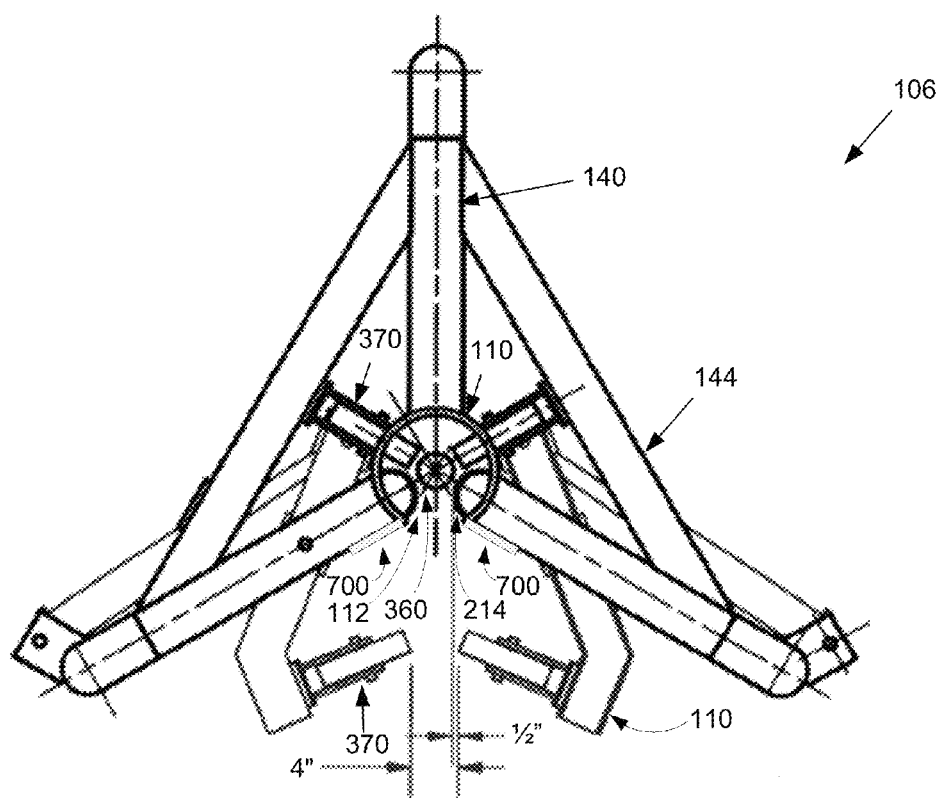
FIG. 3 is an end view of an embodiment of an inspection sled illustrating opened swing arms with a portion of the cable inserted within each collar.

FIG. 3 is an end view of an embodiment of an inspection sled illustrating opened swing arms with a portion of the cable inserted within each collar. Cable 360 is illustrated in cross section as being inserted lengthwise (e.g., about the longitudinal axis) into a central cavity of collar 110. Swing arms 120 are arranged, for example, to be opened such that the inspection sled 100 can lowered onto cable 360 without having to simultaneously "twist" (e.g., rotate about a vertical axis) the sled to avoid contact of the cable 360 with the distal rotational members (e.g., wheels 370) of the swing arms 120.

If for example, the cable 360 is 3 inches in diameter, and the apparent clearance between each wheel on each swing arm is 4 inches in diameter, the cable 360 can be inserted into both collars 110 without rotating the inspection sled 100 about the vertical axis. (Cable guides 214 can be arranged to permit at least 3 inches of clearance between opposing cable guides 214, thus allowing the cable to be inserted.)

If for example, the wheels of swing arms provide less than 3 inches in apparent clearance, the cable 360 can be inserted from the bottom of the inspection sled 100 in the following manner: (1) by rotating the inspection sled 100 about the vertical axis, (2) by lowering the inspection sled over the cable 360 until the wheels of each swing arm 120 passes a minimum clearance from the cable 360, (3) by rotating the inspection sled 100 so that each collar 110 is aligned in accordance with the longitudinal axis of cable 360, and (4) by continuing to lower the inspection sled 100 until the cable 360 is inserted within each collar 110. (FIG. 1 illustrates each swing arms 120 as pivoting in separate planes, which provides additional cable clearance—and helps balance the sled 100 on the cable 360—over than the clearance that is apparent in the end view.) Thus, the cable 360 can be inserted into both collars 110 without having to un-tension the cable 360.

Figure 4:
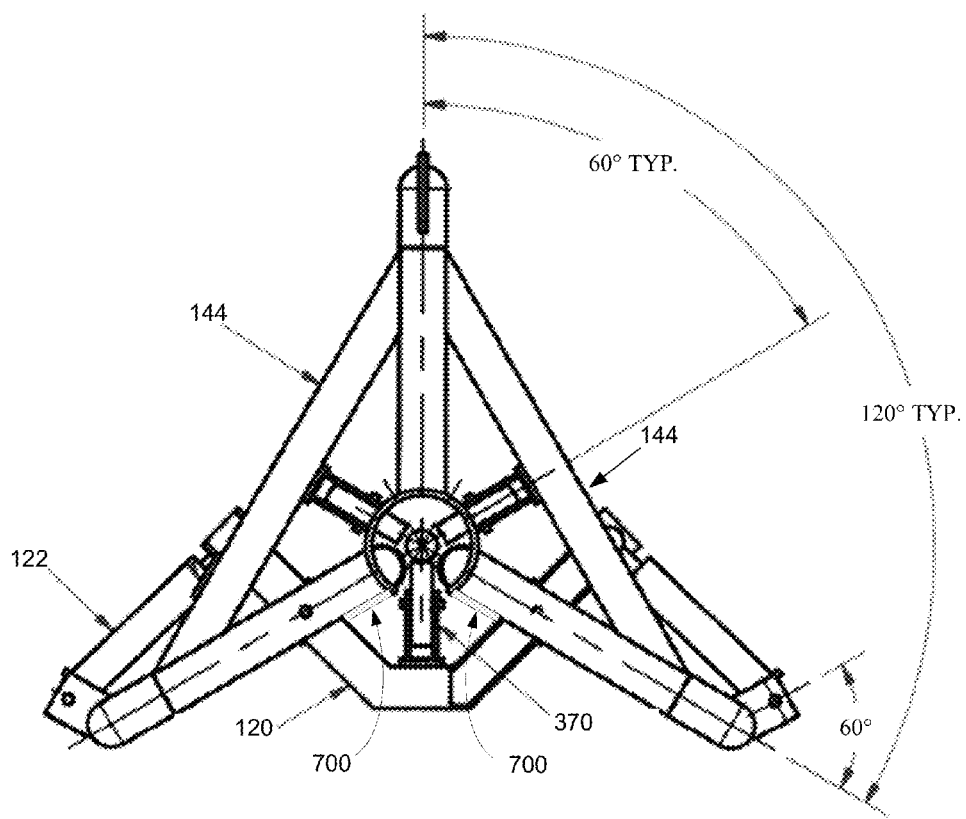
FIG. 4 is an end view of an embodiment of an inspection sled illustrating closed swing arms with the cable slidably journaled within each collar.

FIG. 4 is an end view of an embodiment of an inspection sled illustrating closed swing arms with the cable slideably journaled within each collar. Cable 360 is illustrated in cross section as being inserted lengthwise (e.g., about the longitudinal axis) into the central cavity of collar 110. Swing arms 120 are arranged, for example, to be closed such that the cable 360 is slideably journaled within each collar. The cable 360 is supported by the distal rotational members (e.g., wheels) of the swing arms 120 pivoting upwards to occlude the aperture 112 and to support the cable 360.

The pistons 122 and swing arms can be arranged to provide mechanical advantage (e.g., leverage) such that, for example, the weight of the cable can be lifted and/or supported by the swing arms 120 as urged by the pistons 122. Thus, an un-tensioned cable can also be slidably journaled within inspection sled 100. Sufficient hydraulic force, for example, can be applied to pistons 122 so as to "pinch" (e.g., provide contact) the cable 360 between the each of the rolling surfaces of the wheels associated with each collar 110. Inserting shims (not shown) between braces 144 and rotational members 212 can be used to help "pinch" the cable 360 evenly. Thus, drive motors can be applied to each of the wheels, for example, to aid in deployment and recovery of the inspection sled (for example by using a frictional force applied tangentially to the cable 360 from one or more drive wheels).

Figure 6:
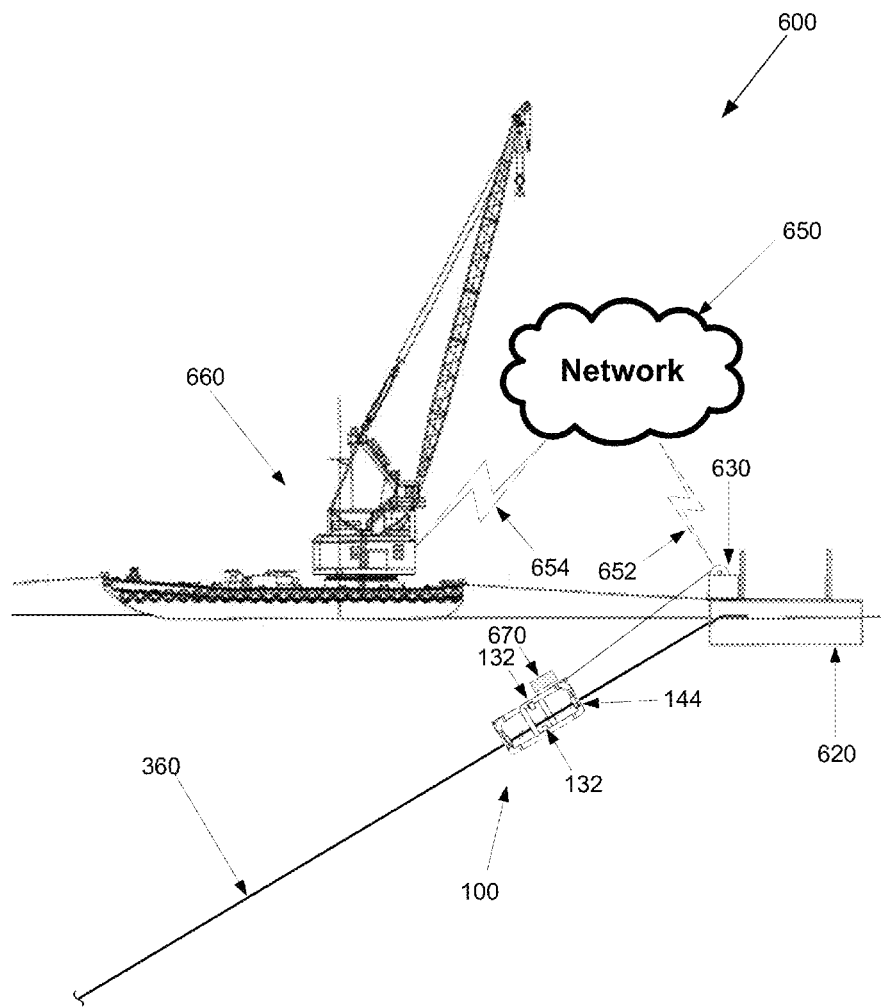
FIG. 6 is a block diagram of an embodiment of a system for deploying and operating the inspection sled.

As illustrated by FIG. 6 below, the inspection sled 100 can be moved relative to the cable 360 (and/or the cable 360 can be moved relative to the inspection sled 100). Frictional forces of moving the cable 360 relative to the inspection sled 100 can be reduced, for example, by the rotational members (e.g., wheels 370) having rolling surfaces within collar 110. Each of the rotational members (e.g., wheels 370) singly or in combination can provide an opposing (orthogonal to the longitudinal axis of the cable) force to the cable 360 from any direction around the sides of the cable 360.

For example, three geostationary communication satellites spaced 120 degrees apart can provide continuous communications coverage of any latitude of Earth. Likewise, the three wheels and/or cable guides 214 can provide any needed sideways force when the cable 360 and/or inspection sled is, for example, "jerked" in any direction oblique to the longitudinal axis. It is understood that angles of other than 120 degrees, for example, can be used such that the needed sideways forces can be provided by the three wheels and/or cable guides.

If for example, the cable 360 is 3 inches in diameter, and the apparent clearance between each wheel on each swing arm is 4 inches in diameter, the cable 360 can be inserted into both collars 110 without rotating the inspection sled 100 about the vertical axis. (Cable guides 214 can be arranged to permit at least 3 inches of clearance between opposing cable guides 214.) If for example, the wheels of swing arms provide less than 3 inches in apparent clearance, the cable 360 can be inserted from the bottom of the inspection sled 100 by rotating the inspection sled 100 about the vertical axis. (FIG. 1 is an isometric view illustrating that each of the swing arms 120 pivot in separate planes, thus providing additional cable clearance over what is apparent in the end view of FIG. 4.) Thus, the cable 360 can be inserted into both collars 110 without having to un-tension the cable 360.

Figure 5:
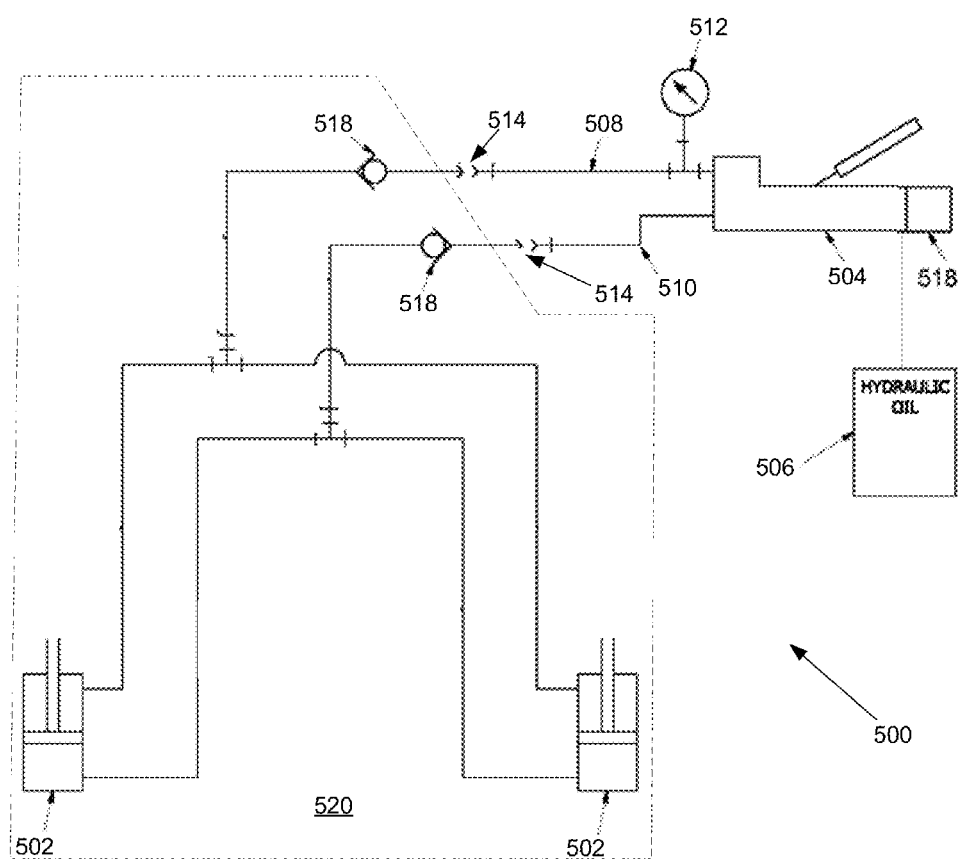
FIG. 5 is a schematic illustrating a hydraulic circuit for opening and closing at least one swing arm in an embodiment of the inspection sled.

FIG. 5 is a schematic illustrating a hydraulic circuit for opening and closing at least one swing arm in an embodiment of the inspection sled. Circuit 500 generally (and not exclusively) includes a hydraulic pump 504 for actuating hydraulic cylinders 502 (e.g., for driving pistons 122 as discussed above). Hydraulic pump 504 can be, for example, a hand pump that includes a pressure relief valve 518 and a reservoir of (e.g., environmentally safe, biodegradable) hydraulic fluid 506.

Hydraulic pump 504 can be arranged to, for example, alternately apply hydraulic pressure to first line 508 and second line 510 to actuate the swing arms 120. Check valves 514 can be used, for example, to allow the hydraulic pump 504 to be disconnected (and/or removed) from the circuit 500 before deploying the inspection sled 100. The check valves can be arranged, for example, to maintain hydraulic pressure even when the sled portion 520 of circuit 500 is not coupled to the hydraulic pump 504. Thus, the swing arms 120 can remain in a closed position, even without the hydraulic pump 504 being coupled to the portion of the hydraulic circuit 520 that is resident on the inspection sled 100. A pressure gauge 512 can be optionally included to verify the hydraulic pressure applied to the first and/or second lines 508 and 510.

Hydraulic pump 504 can be arranged to, for example, alternately apply hydraulic pressure to first line and second lines to actuate (e.g., extend and retract) the rod (e.g., piston) of the hydraulic cylinders 502. For example, applying hydraulic pressure to the first line 508 can cause a change in a first direction in the position of the cylinder rod of cylinders 502, thus causing swing arms 120 to close. Likewise for example, applying hydraulic pressure to the second line 510 can cause a change in an opposite direction in the position of the cylinder rod of cylinder 502, thus causing swing arms 120 to open.

FIG. 6 is a block diagram of an embodiment of a system 600 for deploying and operating the inspection sled. Inspection sled 100 is illustrated as being deployed in a hostile environment (e.g., being submerged). Cable 360 is used to anchor floating structure 620 (such as a barge, pontoon, caisson, and the like) and is illustrated as being tensioned to counter drifting effects caused by, for example, winds, tides, currents, and waves.

Deployment station 630 is arranged, for example, on the floating structure 620 for deployment of the inspection sled 100. The deployment station 630 can be, for example, bolted, tied, or otherwise securely affixed to the floating structure 620. The inspection sled 100 can be lowered, for example, by vessel 660 onto the cable 360 before deployment for inspecting cable 360. The inspection sled 100 can be lowered, for example, with the swing arms 120 in an open position to insert the cable to be inspected (e.g., a sample cable), and the swing arms 120 subsequently being actuated to a closed position to journal the cable (as discussed above) within the inspection sled 100.

Inspection sled 100 can be tethered, for example, to deployment station 630 by tether 640. The tether 640 can include, for example, a steel support cable, and electrical and signal cables (and/or wires) for powering, controlling, and monitoring the inspection sled 100. For example, the inspection sled 100 can be deployed (and retrieved) using a tether controlled by a winch of deployment station 630 to unwind the tether 640 (in conjunction with gravitational and/or buoyant forces) such that the inspection sled 100 gradually traverses a selected length of cable 360. While retrieving the sled, for example, increasing the buoyancy of the inspection sled 100 (by remotely inflating an airbag 670 with stored compressed air) can be used to help counter gravitational effects.

Cameras 132 can be used to inspect the cable 360. At least three cameras 132 can be deployed circumferentially around the cable 360 (with around 120 degrees of separation, for example) to provide substantially continuous inspection coverage of the cable 360. Camera lights may be integrated with the cameras 132, for example, so as to permit optical inspections of the cable 360 where the cable 360 extends down into an aphotic zone.

In conjunction with the above disclosure, other types of sensors and equipment can be deployed using the inspection sled 100. For example, robotic servicing equipment (including welding and grappling equipment) can included on the inspection sled and operated remotely.

Network 650 can be used to provide remote command and communications capabilities between remote operators and inspectors (such as on vessel 660), the deployment station 630, and the inspection sled 100 itself. Network 650 can be a suitable network such as a point-to-point, cellular, optical, and the like. For example, commands from vessel 660 can be transmitted using links 652 and 654 via network 650 to deployment station 630, which can in turn, relay such commands to the inspection sled 100. The inspection sled 100 can communicate, for example, information from its sensors (such as the cameras 132, pressure, motor current, end, or ground contact switch, and the like) to the deployment station 630. The deployment station 630 can transmit such data, for example, to the operators and inspectors on vessel 660 using links 652 and 652 via network 650 for presentation of a user interface of the remote operators and inspectors.

Figure 7:
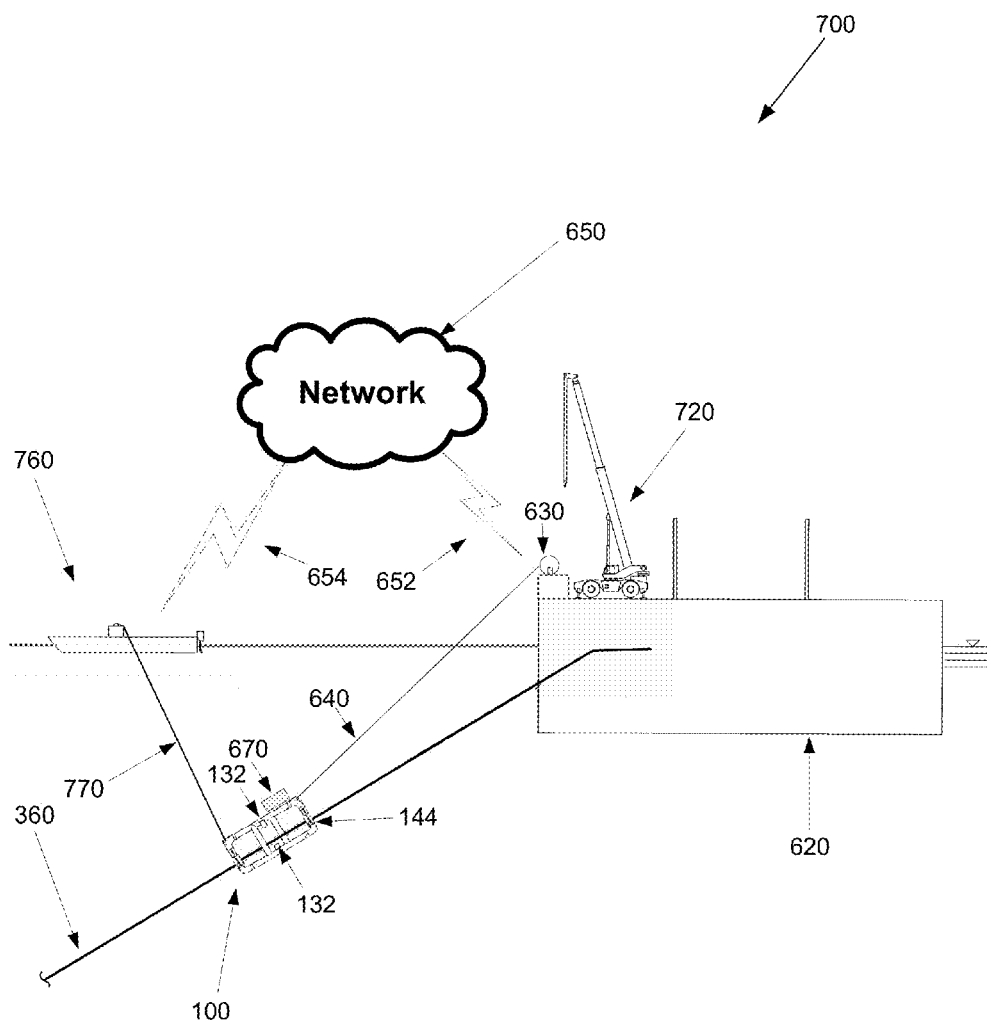
FIG. 7 is a block diagram of another embodiment of a system for deploying and operating the inspection sled.

FIG. 7 is a block diagram of another embodiment of a system 700 for deploying and operating the inspection sled. The inspection sled 100 can be lowered, for example, by crane 720 onto the cable to be inspected (e.g., sample cable 360). The inspection sled 100 can be tethered, for example, to the deployment station 630 by tether 640. The tether 640 can include, for example, a steel support cable. A tow line 770 may include electrical and signal cables (and/or wires) for powering, controlling, and monitoring the inspection sled 100. The tow line 770 can be coupled between the inspection sled 100 and a deployment vessel 760 to aid deployment of the inspection sled 100. The deployment vessel 760 (which may be a vessel such as a skiff or small boat) may house equipment such as communications equipment and video recording equipment used for monitoring the condition the cable.

For example, the inspection sled 100 can be deployed using the tow line 770 to tow the inspection sled 100 while a tether controlled by a winch of deployment station 630 unwinds the tether 640 as the inspection sled 100 gradually traverses a selected length of cable 360. While retrieving the sled, the winch of deployment station 630 can spool the tether 640 as the deployment vessel 760 retrieves the tow line 770. Crane 720 can be used to raise the inspection sled from the cable being inspected (for example, while the hydraulic pressure of swing arms 120 is released) and bring the inspection sled 100 aboard the floating structure 620 or the deployment vessel 760.

In conjunction with the above disclosure, other types of sensors and equipment can be deployed using the inspection sled 100. For example, robotic servicing equipment (including welding and grappling equipment), mechanical cleaning devices, and essay equipment can included on the inspection sled and operated remotely by operators via network 650.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An inspection sled for inspecting a tensioned cable in an underwater environment, comprising:
    a first and second end defining a longitudinal axis, wherein each of the first and second ends respectively comprises a collar, each collar having a respective aperture arranged to receive a sample cable oriented lengthwise in accordance with the longitudinal axis, wherein each collar respectively comprises a respective first and second rotational member, the respective first and second rotational member of each respective collar each having an axis of rotation that is different from any other rotational member that has a rotational portion disposed within the respective collar;
    a swing arm respectively associated with each collar and is arranged to open to permit insertion of the sample cable within the respective collar and arranged to close to slidably journal the sample cable, wherein the respective swing arm is arranged with a proximal portion arranged to be driven by a respective actuator and is arranged with a distal portion disposed with a respective third rotational member, wherein the respective third rotational member is at least partially inserted within the respective aperture of the respective collar when the respective swing arm is closed, wherein each actuator comprises a respective piston for actuating each respective swing arm, and wherein each piston is arranged to be hydraulically actuated by a hydraulic force supplied external to the inspection sled; and
    a chassis arranged to couple the first end to the second end, wherein the chassis comprises at least one inspection station that includes a sensor that is arranged to transmit a signal in response to inspecting the sample cable.

2. The sled of claim 1, wherein each collar comprises:
    a first and second cable guide disposed between the respective aperture of the respective collar and each of the respective first and second rotational members.

3. The sled of claim 2, wherein the rotational members are wheels.

4. The sled of claim 2, wherein the chassis comprises:
    radial arms having an inside end respectively coupled to the collar of each of the first and second ends; and
    longitudinal arms wherein each longitudinal arm is respectively coupled between an outside end of a radial arm of the first end with a respective radial arm of the second end.

5. The sled of claim 1, wherein the chassis comprises:
    a first set of three radial arms each having an inside end respectively coupled to the collar of the first end and an outside end opposite the inside end of the first set of three radial arms;
    a second set of three radial arms each having an inside end respectively coupled to the collar of the second end and an outside end opposite the inside end of the second set of three radial arms;
    wherein the radial arms of the first set are radially disposed around the collar of the first end at approximately 120 degrees spacing from each other and wherein the radial arms of the second set are radially disposed around the collar of the second end at approximately 120 degrees spacing from each other; and
    a plurality of longitudinal arms wherein each longitudinal arm is coupled between a radial arm of the first end with a respective radial arm of the second end.

6. The sled of claim 1, wherein the chassis comprises:
    a first set of three radial arms each having an inside end respectively coupled to the collar of the first end and an outside end opposite the inside end of the first set of three radial arms;
    a second set of three radial arms each having an inside end respectively coupled to the collar of the second end and an outside end opposite the inside end of the second set of three radial arms;
    wherein the radial arms of the first set are radially disposed around the collar of the first end at approximately 120 degrees spacing from each other and wherein the radial arms of the second set are radially disposed around the collar of the second end at approximately 120 degrees spacing from each other; and
    a plurality of longitudinal arms wherein each longitudinal arm is coupled between a radial arm of the first end with a respective radial arm of the second end, and wherein the inspection station that includes the sensor that is arranged to transmit a signal in response to inspecting the sample cable is coupled to each of the longitudinal arms.

7. The sled of claim 1, wherein the chassis comprises:
    radial arms each having an inside end coupled to the respective collar of each of the first and second ends, wherein each radial arm is disposed about the longitudinal axis in an arc between respective adjacent radial arms coupled to the respective collar;
    longitudinal arms wherein each longitudinal arm is coupled between a radial arm of the first end with a respective radial arm of the second end, and wherein the inspection station that includes a sensor is coupled to each of the longitudinal arms; and
    wherein each respective piston is functionally coupled between a radial arm and a longitudinal arm of each of the first and second ends.

8. The sled of claim 1, wherein the chassis comprises at least three inspection stations that are disposed about the longitudinal axis to provide substantially continuous inspection coverage of the sample cable.

9. The sled of claim 1, wherein the chassis comprises an attachment point that is adapted to receive a tether for controlling movement of the inspection sled relative to the sample cable.

10. The sled of claim 1, wherein the chassis comprises an airbag that is adapted to inflate to increase the buoyancy of the inspection sled.

11. The sled of claim 1, wherein a hydraulic force used to close each swing arm is maintained by a check valve.

12. A method for inspecting a tensioned underwater cable, comprising:
- providing a chassis having a collar at each of a first and a second end of the chassis, the arrangement of the collars defining a longitudinal axis, wherein each of the first and second collars respectively includes a respective aperture arranged to receive a sample cable oriented lengthwise in accordance with the longitudinal axis, and wherein each collar comprises a respective first and second rotational member, the respective first and second rotational member of each respective collar each having an axis of rotation that is different from any other rotational member that has a rotational portion disposed within the respective collar;
- opening a swing arm that is respectively associated with each collar to permit insertion of the sample cable within the associated collar, wherein each swing arm includes a respective third rotational member disposed on a distal portion of the respective swing arm;
- inserting the sample cable within each associated collar so that the sample cable is aligned lengthwise with the longitudinal axis;
- closing the swing arm respectively associated with each collar to occlude the respective aperture and to slidably journal the sample cable within the associated collar, wherein the respective third rotational member is at least partially inserted within the respective aperture of the associated collar when the respective swing arm is closed, wherein the swing arm is closed by a respective piston for actuating the respective swing arm, and wherein each respective piston is arranged to be hydraulically actuated by a hydraulic force supplied external to the chassis; and
- inspecting the sample cable in an underwater environment by moving the chassis relative to the sample cable, wherein frictional forces of the cable tangential to the respective third rotational member cause the respective third rotational member to rotate when the chassis is moved relative to the sample cable, and by transmitting a signal in response to a sensor that is monitoring the sample cable as the chassis is moved relative to the sample cable.

13. The method of claim 12, wherein each swing arm is opened by driving a proximal portion of each swing arm by driving a respective piston.

14. The method of claim 12, wherein each swing arm is closed by driving a proximal portion of each swing arm by driving a respective piston.

15. The method of claim 12, wherein each swing arm is opened and closed by driving a proximal portion of each swing arm by driving a respective piston using a removable hydraulic pump, and wherein each swing arm remains driven closed by a check valve for maintaining hydraulic pressure after the hydraulic pump is removed.

16. The method of claim 12, wherein the sample cable is inspected by selectively moving the chassis relative to the sample cable in response to controlled deployment of a tether cable.

17. The method of claim 12, comprising providing at least a portion of a respective first and a second rotational member in each of the collars, wherein each respective first and second rotational members is disposed in an arc about the longitudinal axis of approximately 120 degrees between adjacent coupled to the same collar.

* * * * *